United States Patent Office 2,997,344
Patented Aug. 22, 1961

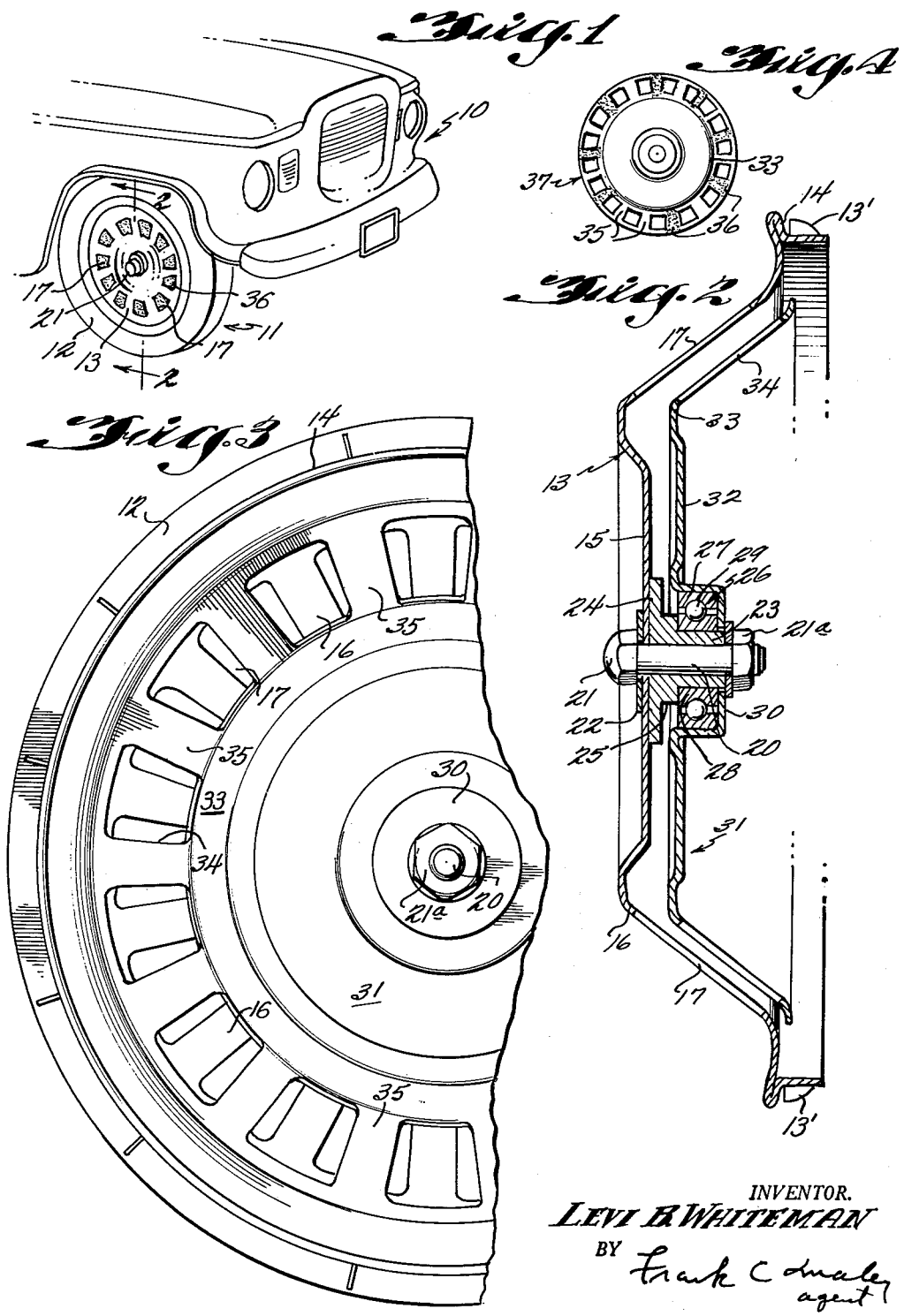

2,997,344
WHEEL COVER
Levi B. Whiteman, 901 Beechwood Ave., Collingdale, Pa.
Filed Dec. 28, 1959, Ser. No. 862,378
4 Claims. (Cl. 301—37)

This invention relates to a hub cap, and more particularly to a hub cap for motor vehicles such as automobiles, trucks or the like.

A primary object of this invention is the provision of an improved hub cap which includes an outer hub rotatable in the conventional manner with the vehicle wheel, and having apertures therein, and an inner hub having colored segments thereon, which is mounted for rotation independently of the outer hub, so that the colored segments of the inner hub are visible through the openings in the outer hub when the vehicle is stopped, to provide a visual signal for vehicles approaching at right angles, thus providing an effective safety device.

An additional object of the invention is the provision of such a hub cap, which is highly ornamental during the normal travel of the vehicle.

An additional object of the invention is the provision of such a device, wherein the inner hub cap may be provided with colored segments of luminous paint so as to be readily visible at night.

A further object of the invention is the provision of such a device, wherein the inner hub cap is rotatably mounted on a bearing carried by the interior of the outer hub cap, so as to be freely rotatable independently of the outer hub cap.

Still another object of the invention is the provision of such a device, wherein the bearing is of a type which may be readily removed for replacement purposes.

Still another object of the invention is the provision of such a hub cap, which is sturdy and durable in construction, reliable and efficient in operation, relatively simple and inexpensive to manufacture and install, and which may be readily and expeditiously applied to any motor vehicle wheel.

Still other objects reside in the combinations of elements, arrangements of parts and features of construction, all as will be more fully pointed out hereinafter and shown in the accompanying drawing.

In the drawing:

FIGURE 1 is a fragmentary perspective view of a portion of a motor vehicle showing a front wheel with the hub cap of the instant invention applied thereto.

FIG. 2 is an enlarged sectional view taken substantially along the line 2—2 of FIG. 1 as viewed in the direction indicated by the arrows.

FIG. 3 is a fragmentary plan view of the assembled inner and outer hub caps as viewed through the interior of the device, and, FIG. 4 is a reduced plan view of the inner hub cap removed from its associated outer cap and wheel.

Similar reference characters refer to similar parts throughout the several views of the drawing.

Referring now to the drawing in detail, and more particularly to FIG. 1, there is generally indicated at 10 a motor vehicle of any conventional type which includes the customary wheels, one of which is generally indicated at 11, which includes a tire 12. The wheel is mounted in the usual manner (not shown).

The device of the instant invention comprises an outer hub cap 13 that is provided with a peripheral turned flange 14 provided with conventional latches 13' and which is suitably secured in any desired conventional manner to the peripheral rim of the vehicle wheel 11. The outer hub cap 13 includes a central dished portion 15, and a marginal outwardly convexed rim 16, provided with a plurality of equidistantly spaced segmentally spaced openings 17. The openings may be of any desired size or shape, and are spaced apart so that there is a thickness of material between each opening.

The central dished portion 15 is provided with a central opening through which extends a bolt 20 having an outer head 21, which is seated on a washer 22.

The bolt 20 is surrounded by a bearing sleeve 23, having an end flange 24 seating against the inside of the dished portion 15, and a reduced flange 25 which serves as a retaining ring for a bearing generally indicated at 26, and including an outer race 27 and an inner race 28 which are channeled to receive ball bearings 29. The bearing 26 is contained in a central cup-shaped member 30 which is positioned at the center of the inner hub, generally indicated at 31.

A nut 21a engages the outer threaded end of bolt 20 to hold the inner hub 31 in freely rotatable relation with the outer hub 13.

The inner hub 31 includes a central dished portion 32 surrounding the cup-shaped portion 30, and having a concaved rim portion 33, which is provided with a series of spaced apertures 34, between which are positioned struts 35. Some or all of the struts 35 are suitably colored as indicated at 36, the arrangement being such that the colored faces of the struts 35 are readily visible through the openings 17. The arrangement is such that due to the bearing assembly 26, the inner hub 31 is freely rotatable relative to the outer hub 13, so that when the vehicle is stopped after traveling forwardly or rearwardly, the cessation of rotative movement of the outer hub 13 does not cause cessation of the rotary movement of the inner hub 31, inertia causing the same to continue at a rate of speed in accordance with the previous speed of the vehicle. This movement will continue for an indeterminate period of time, during which time the colored segments 36 will be alternately visible through the openings 17 to provide an intermittent flashing signal which will be readily visible to a vehicle or person approaching at right angles, even under conditions of impaired visibility.

In order to replace either the inner hub 31 or the bearing assembly 26, it is simply necessary to loosen the nut 21a, remove the inner hub 31 from bolt 20, and remove the bearing assembly from the interior of the cup-shaped portion 30.

Obviously, the device of the instant invention may be applied to any or all of the wheels of the vehicle, the inner hub may be made solid if desired, and the colored segments may be of any desired shape or relative thickness and any suitable readily visible color.

Equally obviously, the inner hub may be painted with luminous paint to render the same visible at night if desired.

From the foregoing it will now be seen that there is herein provided an improved vehicle hub cap which accomplishes all of the objects of this invention and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. In combination with a vehicle wheel including a peripheral rim, an outer hub cap including a central dished portion having a marginal outwardly convexed rim that is provided with a plurality of equi-distantly spaced openings circumferentially disposed thereabout, a peripheral turned flange on the rim of said hub cap attaching said hub cap to the rim of said wheel, a bearing sleeve having an end flange thereon abutting the central portion of the central dished portion of said hub cap on the inside thereof, a bolt extending through said central dished portion and said bearing sleeve to secure said bearing sleeve to said central dished portion in fixed relation thereto, and an inner hub cap having a plurality of colored segments therein mounted for rotation on said bearing sleeve that is fixed to said outer hub cap for independent rotation relative thereto.

2. The structure of claim 1 wherein the mounting for said inner hub cap comprises a cup-shaped portion that is integral with the central portion of said inner hub cap and a bearing assembly positioned in said cup-shaped portion and mounted on the bearing sleeve carried by the bolt upon which said inner hub cap is rotatably mounted.

3. The structure of claim 2 wherein said inner hub cap is provided with a plurality of circumferentially disposed openings that are spaced from each other by struts, at least some of said struts being colored in a color contrasting to that of the outer hub cap.

4. The structure of claim 3 wherein the struts are colored with luminous paint.

References Cited in the file of this patent

UNITED STATES PATENTS

| | | |
|---|---|---|
| 2,130,220 | Ball et al. | Sept. 13, 1938 |
| 2,869,262 | Lucas | Jan. 20, 1959 |

FOREIGN PATENTS

| | | |
|---|---|---|
| 8,468 | Great Britain | 1896 |
| 3,117 | Great Britain | 1913 |